INVENTOR
EDWARD R. MARGIS
BY
George W. Wright, Jr.

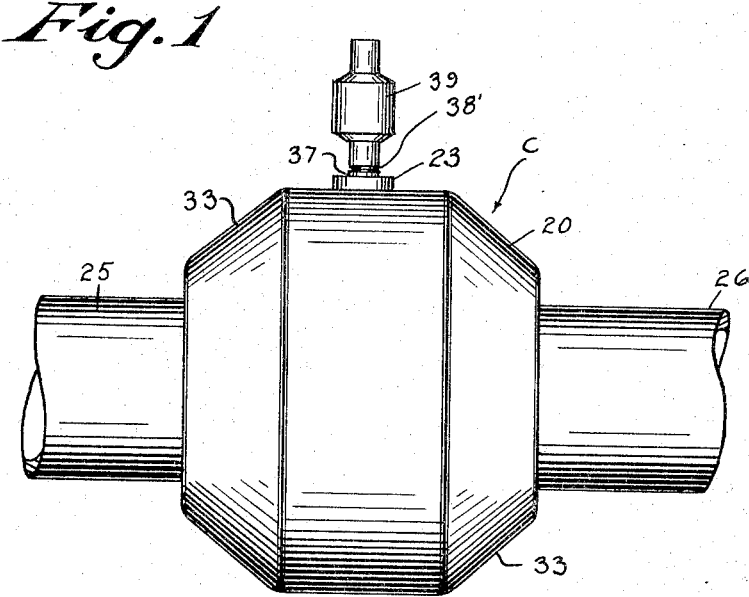
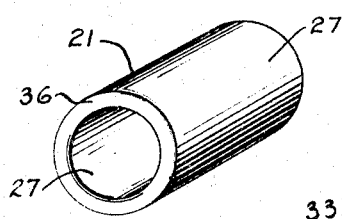
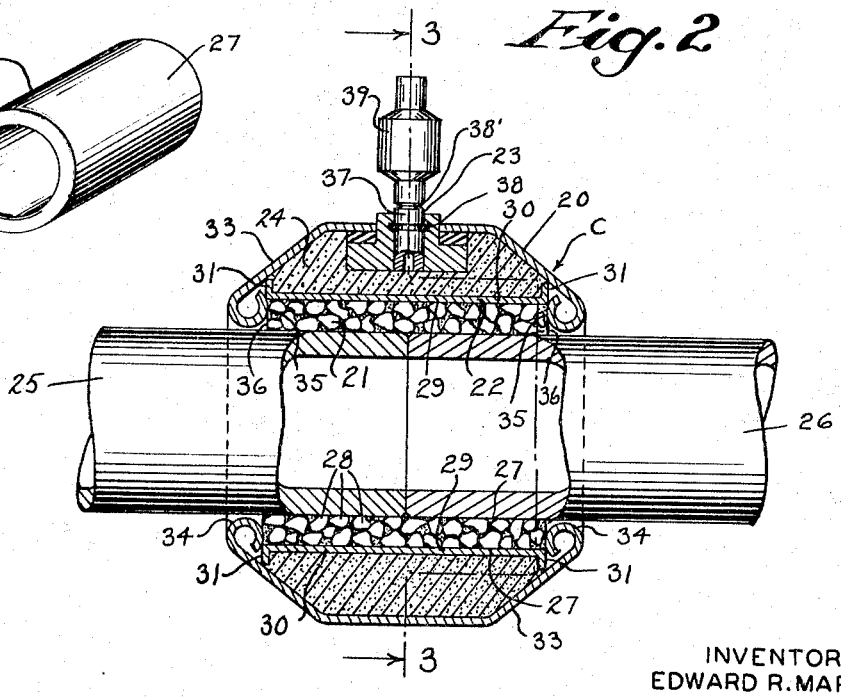

June 13, 1967  E. R. MARGIS  3,325,195
COUPLING AND SEALING STRUCTURES
Filed Nov. 30, 1964  3 Sheets-Sheet 3
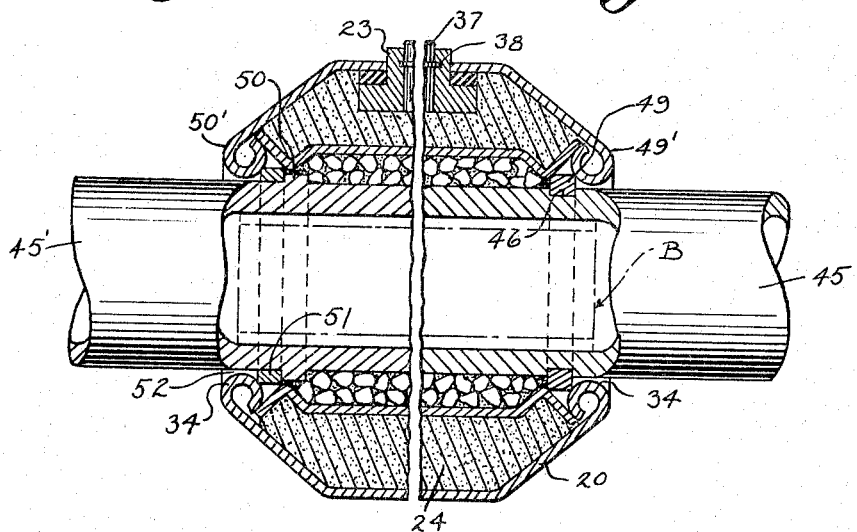
*Fig. 8*  *Fig. 8a*
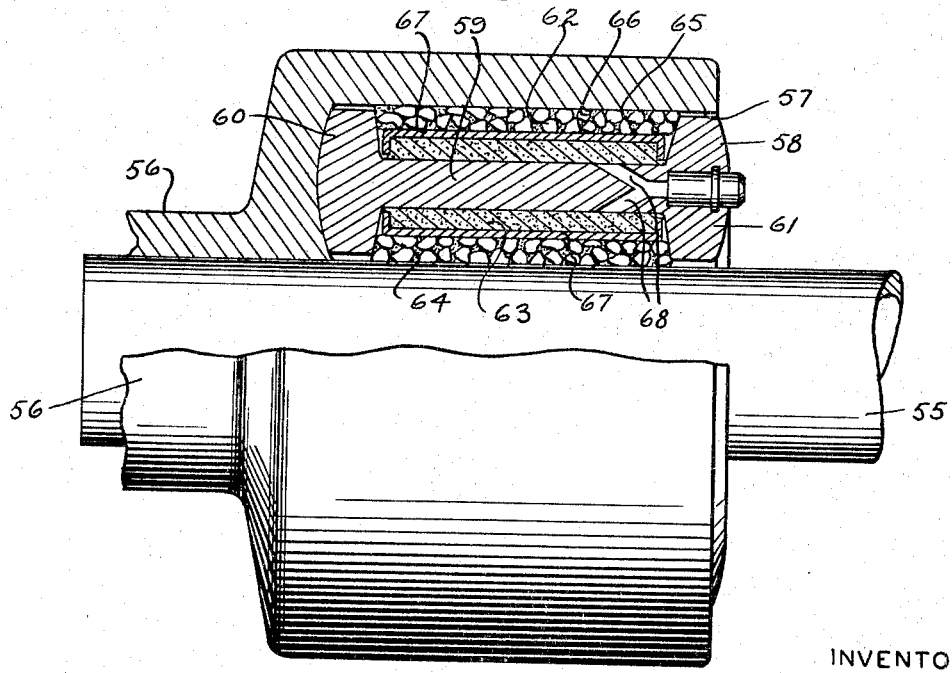
*Fig. 9*
INVENTOR
EDWARD R. MARGIS
BY George W. Wright, Jr.

United States Patent Office 3,325,195
Patented June 13, 1967

3,325,195
COUPLING AND SEALING STRUCTURES
Edward R. Margis, 5011 N. Palisades Road,
Whitefish Bay, Wis. 53217
Filed Nov. 30, 1964, Ser. No. 414,690
2 Claims. (Cl. 285—294)

My invention appertains to joints and couplings, and more particularly to new and useful improvements in pressurized sealing and coupling structures for various types of pipe and the like.

The relatively high cost and problems involved in the manufacture and use of threaded pipes and threaded pipe couplings are well known in the art. Particularly, problems are involved in obtaining a proper and permanent seal for use with different types of liquids. It has also been found that certain materials from which pipes or tubings are made, for example plastic, glass, etc., are not well adapted for a threaded coupling and fastening, particularly where any amount of pressure is needed to obtain a proper seal.

Therefore, attempts have been made in the past to provide a threadless coupling and these attempts have usually been in the form of a hydraulic or pressurized coupling device. However, to my knowledge, most of these prior devices have proven unsatisfactory for a number of reasons, but primarily due again to the difficulty in obtaining a permanent seal under constant pressure and also a majority have been economically unsatisfactory, and complicated to manufacture and use.

It is, therefore, a primary object of my present invention to provide a pressurized or hydraulic pipe coupling that under pressure will provide a positive and permanent seal against leakage of any type.

A further object of my present invention is to provide an improved pressurized and hydraulic coupling for engaging with and fastening generally cylindrical objects, such as pipes and the like.

Another object of my present invention is to provide a hydraulic coupling which can be firmly secured to a pipe without pre-heating the pipe in any manner and which forms a permanent and tight bond with each of the pipes to be joined.

Still another object of my present invention is to provide a hydraulic coupling which is measurably better adapted to meet the requirements of practice in the various trades, than those used for the same purpose up to the present time, by providing novel means for actually deforming the members to be joined and effectively and permanently sealing the same.

A salient feature of my present invention resides in providing a coupling member wherein the primary device for gripping and joining the pipe ends (gripping and sealing mass) is in the nature of a cold flow plastic cylinder or sleeve having hard granular material embedded therein which under pressure will cold flow and deform and force the hard granular material into the material to be joined and sealed.

An important object of my present invention is to provide a novel hydraulic coupling structure which includes a grain barrier about the primary gripping and sealing device and which can be deformed and moved under pressure from a suitable flowable material so as to properly seal the fitting and coupling structure itself as well as to cause the gripping and sealing mass to firmly grip and seal the joined members.

A further object of my present invention is to provide a hydraulic coupling and fitting for pipes and the like which can be made from different types of materials and utilize different types of flowable material and which can be made small or large for use on different sized joints and pipes, tubings of any shape or contour and still give a permanent coupling and sealing means.

A still further object of my present invention is to provide a simple, practical, and reliable construction that is relatively economical to manufacture, easy to assemble and positive in its operation.

With the above and other objects in view, as will appear as the nature of the invention is better understood, the same consists in the novel construction, combination and arrangement of parts hereinafter more fully described, illustrated and claimed.

A preferred and practical embodiment of my invention is shown in the accompanying drawings, in which, FIGURE 1 is a side elevational view in perspective showing the coupling member joined to lengths of pipe;

FIGURE 2 is a transverse longitudinal section taken through the coupling shown in FIGURE 1 of the drawings, the section being represented by the line 2—2 of FIGURE 3 and looking in the direction of the arrows;

FIGURE 5 is a reduced end view in perspective of the primary coupling means (gripping and sealing mass);

FIGURES 8 and 8a represent longitudinal vertical sections similar to FIGURE 2 of the drawings, but illustrating modified forms of the coupling when the coupling is to be utilized with different pipes or types of pipes. FIGURE 8 the left hand figure pertains to pipes having a raised collar and FIGURE 8a pertains to pipes having a peripheral groove;

FIGURE 9 is an enlarged fragmentary vertical section through another modified form of the invention illustrating how the fitting can be utilized to join sections together of the bell type, wherein one of the members to be joined is provided with an enlarged end adapted to receive the smaller end of another member therein.

Figure 3:
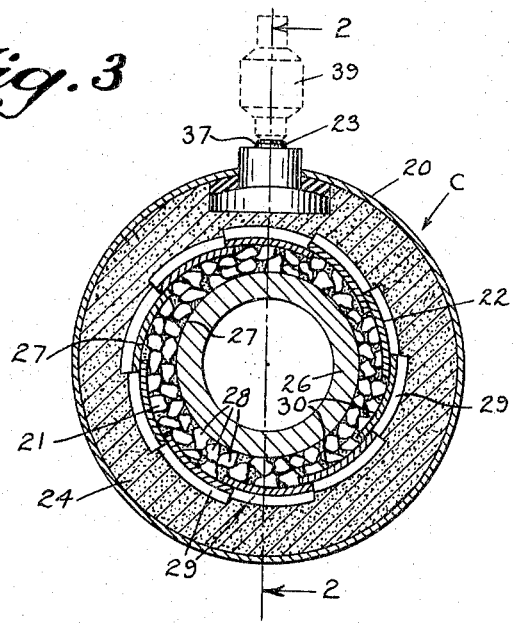
FIGURE 3 is a transverse section through the coupling member as shown in FIGURE 1 of the drawings and the section is represented by the line 3—3 of FIGURE 2 of the drawings, looking in the direction of the arrows.
Figure 4:
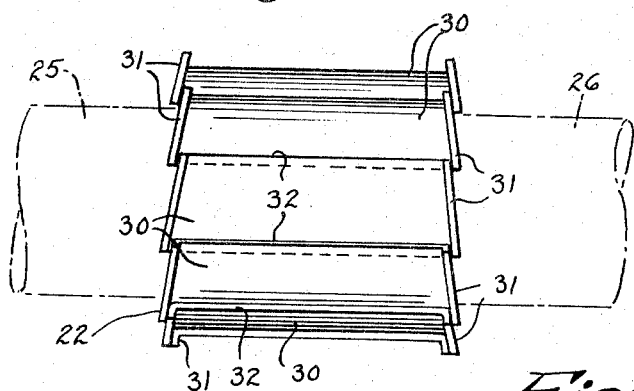
FIGURE 4 is a side elevational view in perspective of my novel coupling device with the outer shell or casing and pressurized material removed therefrom to illustrate primarily details in the construction of the grain barrier.

Referring to the drawings in detail, wherein similar reference characters designate corresponding parts throughout the several views, the letter C generally indicates one type of my improved hydraulic coupling and fitting and it can be seen that the same includes broadly an outer cylindrical shell or housing 20, the inner primary coupling member (gripping and sealing mass) 21, grain barrier 22, pressurized fitting 23, and the flowable material under pressure 24. The coupling, as shown in FIGURES 1 to 6, inclusive, is utilized primarily to join together two lengths of pipe 25 and 26 respectively, having a smooth and uninterrupted surface, as shown.

It is of course, a salient feature of my invention to provide a pressurized or hydraulic coupling member which eliminates the necessity of treating the ends of pipes to be joined and eliminates the costly manufacturing step of tapping and threading fittings, etc.

Great stress is laid on the gripping and sealing mass and attention is directed primarily to FIGURES 2 and 5 of the drawings, wherein it can be seen that this mass is molded in the form of a cylinder or sleeve 21 (FIGURE 5), and any desired type of plastic having cold flow characteristics can be utilized. The same is molded with smooth outer and inner surfaces 27 but embedded within the material are the hard grains or granular material 28. The size of the grains may vary according to use, but preferably are in the nature of 1/16″ diameter and it should also be stressed that while I have shown and described the grains throughout the entire mass, they could merely be single or monolayer of grains. The cylinder or sleeve 21 can be made to fit any desired standard pipes, and of course, the size of the coupling per se will vary in accordance with the size of the pipes to be united. About the outer surface of the sleeve or cylinder 21, I provide the aforementioned grain barrier 22, and in the preferred form of the invention, this barrier includes a series of identically shaped interlocking members 29. Each is identically formed and includes a curved base 30 contoured to approximate the curvature of the cylinder or sleeve 21 and side flanges 31 extend upwardly as shown and diverge as shown. In other words, the flanges are placed at an angle from the leading edge 32 of each member. Thus, it can be seen that when these members are placed in the position shown in FIGURES 3 and 4 of the drawings, each edge 32 overlies the adjacent base 29 of the next member to form the complete grain barrier. This grain barrier is preferably made of a deformable material and the purpose of this will become evident as the description proceeds. About the cylinder 21 and grain barrier 22 is the outer housing or shell 20 and this housing or shell is of a generally cylindrical shape with the end walls 33 inclined or made conical. The end terminations of each wall 33 are inturned to form the reinforcing beads 34. The inner wall 35 of each bead 34 rests against the adjacent end wall 36 of the cylinder 21. In assembling the unit it should be understood that preferably the injection compound or material is not placed within the housing or shell until the coupling is to be actually used. Although, in order to aid in retaining the members 29 of the grain barrier in place, I add a small amount of the injection compound to the approximate level of the longitudinal sectional lines of FIG. 3, and this will aid in retaining the barrier in place. It is possible, however, to fill the chamber with the compound 24 before the coupling is to be used but the material is not pressurized before such use.

The injection compound is preferably of the consistency of a putty and is of the type that will set and harden after it has been injected under pressure. To inject the compound 24 into the shell 20 under pressure I provide the pressure fitting 23, and this fitting can be of any desired type and as shown includes the hollow stem 37 and proper seals 38, as shown.

When it is desired to join two sections of pipe 25 and 26, it is merely necessary to slip the ends of the pipe within the smooth surface 27 of the cylinder and sleeve 21 until the ends abut, as shown. Then the injection compound 24 is forced into the shell 20 through the pressurized fitting 23 and is forced in under considerable pressure. This pressure will deform the grain barrier 22 so that the flanges 31 thereof will seal against the walls 33 of the outer shell 20 and the grain barrier may contract about the gripping and sealing mass (FIGURE 3) and cause the mass to cold flow so that the hard granular material in the form of the grains 28 will actually be embedded both in the grain barrier 22 and in the respective ends of the pipes 25 and 26. The fragmentary sectional view in FIGURE 6 amply illustrates how this is accomplished. Thus, it can be seen that the gripping and sealing mass in the nature of the cylinder 21 not only provides a strong grip for joining the pipe sections but also adequately seals the same against leaks. After the material 24, which is under pressure, has set the coupling is permanently in place and the pipes 25 and 26 are permanently and forcefully secured together. If desired, I may provide the fitting with a weakening groove 38 and any means may be utilized to seal the hollow stem portion and the upper part 39 of the fitting can be knocked off. Due to the fact that the members 29 of the grain barrier 22 deform under pressure they will adequately seal and prevent the injection compound from leaking out of the coupling per se.

Figure 7:
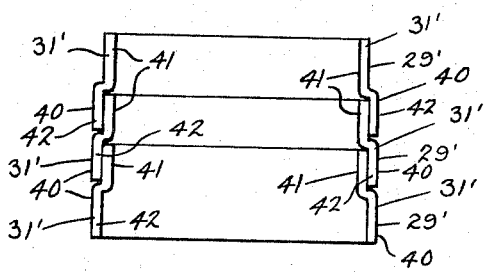
FIGURE 7 is a fragmentary plan view showing a modified form of the grain barrier illustrated in FIGURE 4 of the drawings.
Figure 6:
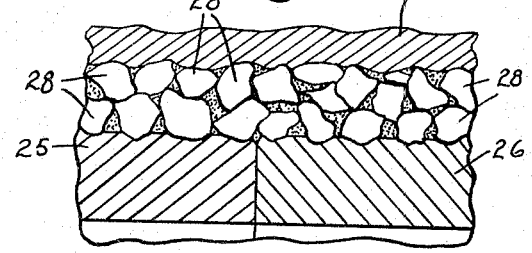
FIGURE 6 is an enlarged fragmentary transverse section illustrating in particular the deformation of the gripping and sealing mass wherein the granular material embeds itself in the material of the members to be joined.

In some instances, however, it may be desirable to provide a more effective means for sealing the grain barrier, and to accomplish this, the grain barrier can be made in the shape shown in FIGURE 7 of the drawings, wherein each of the elements 29′ is again identically formed but the end flanges 31′ of each element are provided with an offset portion 40 so that the section 41 will lie within the adjacent section 42 of the respective adjacent element 29′. In FIGURE 7, the grain barrier 22′ is shown in its full contracted position, but when assembling this form of the invention, the grain barrier 22′ is spread so that each section 29′ just rests within its adjacent member. Each of the sections 29′ is also made of a deformable metal and the outer offset portions 42 provide a substantially straight line or straight leading edge when contracted, as shown, and thus the sealing is accomplished.

While I have shown the preferred form of my invention in FIGURES 1 to 6, inclusive, I may provide modified forms such as the forms illustrated in FIGS. 8, 8a and 9 of the drawings to accommodate the coupling of different types of pipes. For example, in FIG. 8a, each pipe section 45 might be provided with a peripheral groove 46 adjacent each end, and to accommodate the joining of these pipes and to effectively utilize the groove, I can provide a split grip ring 49, which in its initial position will be arranged so that its inner circumference is the same as the inner circumference of the rolled bead 34 of the outer shell 20 and when pressure is applied to the fitting through the compound 24, the grain barrier will deform, as shown in FIG. 8, and its outer flange will press against the ring 49 at point 49′ and close the same into the groove 48. Thus, not only, is the granular material embedded in each of the pipe sections 45 but additional strength is had by the locking of the split ring 48. The pipe might also be provided with an annular raised rib such as represented by the reference number 50 in FIGURE 8, and in this instance, the structure of the fitting would be substantially the same, but a split ring of the type indicated by reference numeral 51 is provided and when the ring is closed by pressure at the point 50′ it abuts the rib 50 to aid in joining the two sections 45′ together. All of the parts of the coupling illustrated in FIGURES 8 and 8a are identical and it should be noted that rings 49 and 51 in FIGURES 8a and 8, respectively each have a radial thickness greater than the radial distance between the reinforcing beads and the portion of the pipe upon which the bottom of the ring abuts so that when pressure is applied at the respective points 49′ and 50′ the respective rings will constrict about the pipes 45 or 45′.

Attention is directed to the fact that the reinforcing beads 34 also provide a flared throat entrance as designated by the reference number 52 and this facilitates the placing of the pipes into the coupling. It should also be noted that prior to the application of the pressurized material 24 that the axial opening in sleeve 21 is in alignment with the axial opening defined by the reinforcing beads 34 and that in the drawings the coupling has been shown under pressure and the sleeve 21 in its constricted position about the pipes for coupling and sealing the same.

In some instances, pipes to be joined are of the bell type and for joining these I utilize the modification illustrated in FIGURE 9 of the drawings. When it is desired to join pipe section 55 to pipe section 56, wherein the section 56 is provided with an enlarged bell type opening 57 as shown, the coupling member is provided with an annular containment ring 58, and this ring in cross-section is shaped somewhat in the nature of a channel iron to provide the annularly extending wall 59 and the thickened outer walls 60 and 61 respectively defining separate chambers 62 and 63. In this form of the invention two spaced plastic cylinders or sleeves are provided. One sleeve 64 is of a size and configuration to fit about the pipe section 55 and other sleeve 65 is of a size and configuration to fit the contour of wall 66 which provides the bell type opening. In each instance, grain barriers 67 are provided and the same compound 24 under pressure is then injected into the respective chambers. Entrance to each chamber is provided by Y-type ports 68 leading from the pressure fitting. Illustrated in FIGS. 8 and 9 of the drawings is a modification in which the upper portion of the fitting has been broken off and the entire coupling is sealed and under pressure and forms, in effect, an integral structure which is permanent, in that, it cannot be removed except by shattering the entire coupling or by cutting the pipe with a torch. The permanent bond by my novel coupling should be greatly stressed, and when the material hardens the sleeves are held in their constricted positions about the pipes.

While the salient feature of my invention resides in providing the cold flow mass with hard granular material, which is embedded in the material to be joined, in a few instances, such as joining glass rods or tubing, the pressure necessary to join the glass tubing would be too great and with the grains puncturing the glass, the glass would probably shatter. Therefore, in this instance, only, I would provide the cold flow mass with grains of a soft deformable substance and these grains would then deform and grip the surface by friction.

My novel coupling can also be utilized to join plastic and rubber tubing and in this instance I would provide a hollow metal insert, such as brass, within the ends of the tubes to strengthen the same so that the ends would not collapse under pressure. This insert is represented by the dotted lines and reference letter B in FIGURE 8 of the drawings.

From the above, it should be apparent that I have provided novel coupling and sealing structures which have the advantage of firmly gripping the pipe ends and of permanently sealing the same against leaks. While I have shown and described certain specific embodiments of my invention, it will be understood that these embodiments are merely for the purpose of illustration and description, that various other forms may be devised, and that changes may be made in the proportions, and minor details of construction, without departing from the spirit of the invention or scope of the appended claims.

I claim:
1. A coupling assembly including, a cylindrical sleeve, a pipe inserted into each end of said sleeve, said sleeve being formed of a cold flow plastic material, relatively hard granular material within said plastic material, a deformable metal barrier arranged about said sleeve, an outer casing having means to confine said sleeve and metal barrier therein and to define an annular chamber surrounding said sleeve and metal barrier, a pressure valve fitting affixed to said outer casing in communication with said chamber to admit a putty-like compound under pressure to said chamber, said compound having the characteristic of hardening after injection, said metal barrier being so constructed and arranged as to deform under pressure of the putty-like compound and seal against the walls of said outer chamber and also constrict about said cylindrical sleeve causing said cylindrical sleeve to flow under pressure to constrict about said respective pipe portions with the hard granular material embedding itself into the pipe and barrier, said deformable metal barrier including a series of identically formed separate units, each unit having an arcuate shaped base wall contoured substantially to the outer surface of said sleeve, upwardly extending end flanges on said base wall terminating adjacent the respective portion of said outer casing, said end flanges being set at an angle extending from one leading edge of said base wall to the other edge, each unit being so constructed and arranged that the leading edge defining the smaller end is set within the respective larger end of the next adjacent unit, whereby upon the application of pressure each unit may move and be constricted relative to one another and the pipes will be forcibly coupled and sealed.

2. A coupling assembly including, a cylindrical sleeve, a pipe inserted into each end of said sleeve, said sleeve being formed of a cold flow plastic material, relatively hard granular material within said plastic material, a deformable metal barrier arranged about said sleeve, an outer casing having means to confine said sleeve and metal barrier therein and to define an annular chamber surrounding said sleeve and metal barrier, said means including, inwardly directed spaced reinforcing beads so constructed and arranged as to have their axial opening in alignment with the axial opening of said cylindrical sleeve, a pair of split rings, each ring being positioned between the reinforcing beads and the respective adjacent edges of said cylindrical sleeve, each ring having a radial thickness greater than the radial distance between the reinforcing beads and the portion of the pipe upon which the bottom of the ring abuts, said pipes having shoulder means which engage the side of the ring which is adjacent the cylindrical sleeve, said metal barrier being so constructed and arranged that when it deforms under pressure it constricts said rings about the pipes to be joined, thereby preventing axial withdrawal of the pipes from the sleeve, a pressure valve fitting affixed to said outer casing in communication with said chamber to admit a putty-like compound under pressure to said chamber, said compound having the characteristic of hardening after injection, said metal barrier being so constructed and arranged as to deform under the pressure of the putty-like compound and seal against the walls of said outer chamber and also constrict about said cylindrical sleeve causing said cylindrical sleeve to flow under pressure to constrict about said respective pipe portions with the hard granular material embedding itself into the pipe and barrier, whereby the pipes will be forcibly coupled and sealed.

References Cited

UNITED STATES PATENTS

| | | | |
|---|---|---|---|
| 1,677,865 | 7/1928 | Kroeger | 285—294 |
| 2,083,842 | 6/1937 | Henning | 285—382.2 X |
| 2,617,672 | 11/1942 | Nichols | 287—20.3 |
| 2,716,275 | 8/1955 | Matthysse | 29—517 X |
| 3,149,861 | 9/1964 | Larsson | 285—349 |

FOREIGN PATENTS 523,402   7/1940   Great Britain.

CARL W. TOMLIN, *Primary Examiner.*

D. W. AROLA, *Assistant Examiner.*